United States Patent Office 3,517,454
Patented June 30, 1970

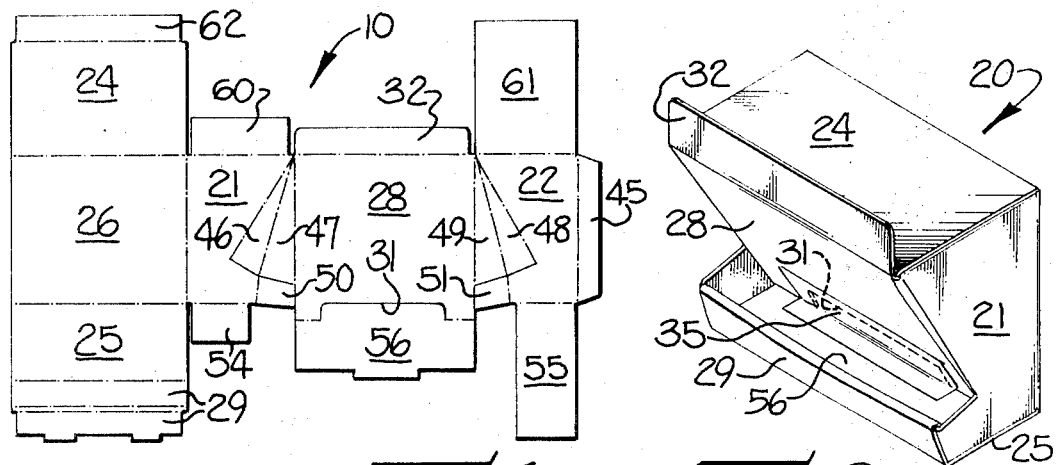
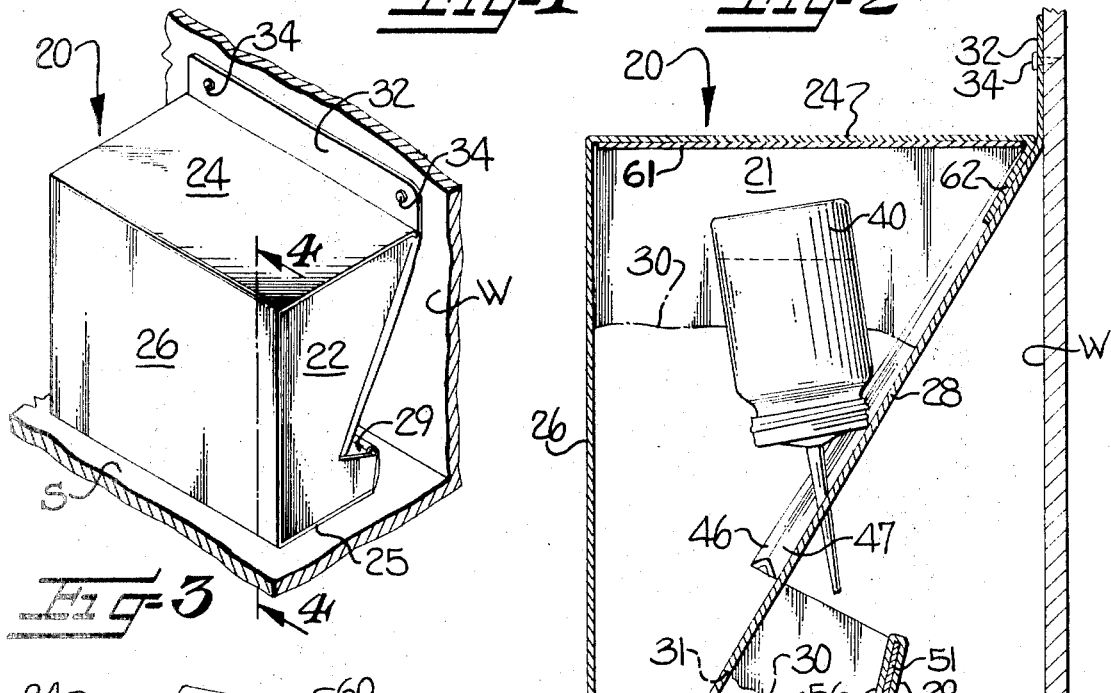
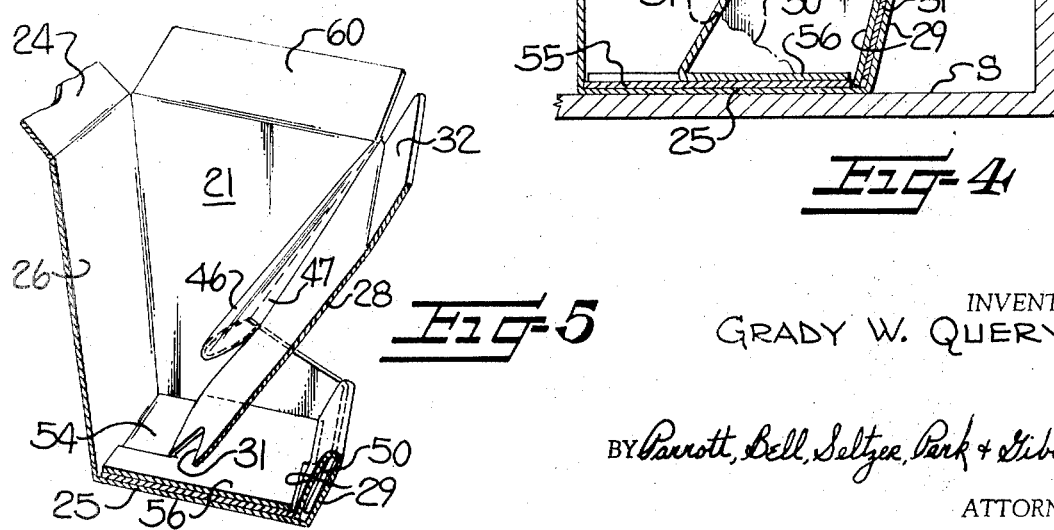

3,517,454
FEEDER AND PACKAGE ARRANGEMENT FOR FLUENT DRY SOLIDS
Grady W. Query, Rte. 4, Matthews, N.C. 28105
Filed Aug. 17, 1967, Ser. No. 661,420
Int. Cl. A01m 25/00
U.S. Cl. 43—131                                    5 Claims

ABSTRACT OF THE DISCLOSURE

A generally rectangular prismatoid container is erected from sheet material such as paperboard scored and folded into a plurality of interconnected panels, with the panels being configured and disposed in such shapes and orientations as to define a receptacle adapted to receive dry solids and to feed the same to a dispensing tray adapted to retain the dry solids in position for unobstructed access by animals.

---

It is well known that rodents tend to follow determinable pathways or runways in and about building structures, and that such runways usually lie closely adjacent vertical abutments such as the building structure walls. This characteristic of rodent behavior has been used advantageously by exterminators, particularly in conjunction with the dispensing of a low toxicity poisoned bait. Low toxicity poisons, while adopted principally in order to provide greater safety for building occupants or domestic animals which may accidentally encounter the poisoned bait, requires a substantial exposure of the rodent to the poisoned bait in order to take lethal effect. In attempts to obtain extended exposure of rodents to a poisoned bait while protecting against accidental contact with the bait by domestic animals or by humans, disposable rodent bait feeders have heretofore been constructed of relatively lightweight foldable material, erected into a box form and having a pair of aligned openings to admit a rodent into the interior of the box for contact with a poisoned bait and to permit the rodent to exit from the box. Such a feeder is then positioned with the tunnel formed by the aligned openings and the interior of the container substantially aligned with a known path of rodent travel.

Such previously known dispensing feeders for fluent dry solids such as rodent bait present particular difficulty in that an obstacle is presented in the normal runway path and a rodent is required to venture onto a floor surface different from that of adjacent portions of the runway. It is believed that, on many occasions, rodents will abandon a runway or change the manner of travel over a portion of a runway where an adventure of this type is required, rather than maintain the previously used runway behavior. In such an event, the poisoned bait is not so disposed as to be brought into contact with the rodents and thus is not effective for its intended lethal purpose.

With a view to these difficulties recognized in the use of previously known disposable dispensing feeders for fluent dry solids such as rodent bait, it is an object of the present invention to provide such a disposable dispensing feeder which cooperates with a building structure wall to define a rodent passageway or runway free from obstruction and which presents to the rodents a floor surface identical to that of adjacent portions of the runway. By presenting to the rodents a runway of this type, the rodents are not given reason to abandon a previously used runway, and a greater opportunity is presented for a rodent bait to have the desired lethal effect.

It has further been recognized that contact by humans with the dry fluent solids employed as rodent baits preferably should be minimized, even though such materials are preferably of low toxicity. With a view to minimizing such contact, it is desirable that dispensing feeders for dry fluent solids such as rodent bait require minimum attention in preparation for installation in the field and during use at the point of installation. More particularly, it is desirable that handing of rodent bait in bulk not be required.

With this end in view, it is an object of the present invention to provide a shipping package and disposable dispensing feeder of fluent dry solids such as rodent bait wherein a quantity of fluent dry solid is placed within a receptacle adapted to retain the dry solid during shipment and for feeding dispensation of the dry solid subsequent to installation at a point of use, and a sealing means occludes a gravitational feeding opening from the receptacle to assure retention of the dry solid during shipment. Upon subsequent rupture of the occluding sealing means as the feeder is placed for use, the fluent dry solid is released from the receptacle for gravitational feeding.

Some of the objects and advantages of the invention having been stated, others will appear as the description proceeds, when taken in connection with the accompanying drawings, in which:

FIG. 1 is a plan view of a blank suitable for erection into the disposable dispensing feeder of the present invention;

FIG. 2 is a perspective view, from the front, of the disposable dispensing feeder of the present invention;

FIG. 3 is a perspective view, from the rear, of the disposable dispensing feeder of the present invention in combination with a building structure wall and floor, positioned as for use in dispensing of rodent bait;

FIG. 4 is a sectional view through the dispensing feeder and buiding structure shown in FIG. 3, taken generally along the line 4—4 in that figure; and FIG. 5 is a perspective view, in partial section, of a portion of a dispensing feeder of FIGS. 2–4, illustrating certain details of the manner in which the blank of FIG. 1 is erected to form the dispensing feeder.

Referring now more particularly to the drawing, a blank 10 (FIG. 1) is there shown as an illustration of one manner in which a plurality of interconnected panels may be laid out on a planar sheet of thin foldable sheet material such as paperboard in order to permit erection of the blank 10 into a disposable dispensing feeder 20 in accordance with the present invention. While the blank 10 is included as an illustration of one manner of cutting and scoring a sheet material, it is not intended as a limitation of such design, and the blank construction may be modified as desired so long as a dispensing feeder having the structural features of the feeder 20 herein disclosed is still obtained. Preferably, the single sheet of material forming the blank 10 is cut and scored to define a plurality of interconnected panels, as identified more particularly hereinafter with reference to the erected feeder 20.

The erected feeder 20 (FIGS. 2–5) has an overall configuration which is generally that of a rectangular prismatoid, in that most of the panels defining the container are right rectangles, while others have a generally trapezoidal outline. More particularly, a pair of substantially parallel spaced apart side panels 21 and 22 are of generally trapezoidal outline, with each panel having a back edge which extends at a right angle with the adjacent top and bottom edges. A pair of right rectangular top and bottom panels, 24 and 25 respectively, are disposed substantially parallel and extend substantially perpendicular to the side panels 21 and 22. A right rectangular back panel 26 extends substantially perpendicular to both of the side panels 21 and 22 and to both of the top and bottom panels 24 and 25.

In order to define with the side panels 21 and 22, top and bottom panels 24 and 25, and back panel 26 a receptacle adapted to receive fluent dry solids and a dispensing tray adapted to receive and retain dry solids dispensed from the receptacle, this invention provides an upper front panel 28 and a lower front panel 29. The upper front panel 28 extends substantially perpendicular to the side panels 21 and 22, and at an acute angle downwardly from the top panel 24 toward convergence with the back panel 26 adjacent the bottom panel 25, so that the volume confined between the back, side, top, bottom panels is a prismatoid receptacle, adapted to receive a quantity of fluent dry solid 30, such as grain treated with low toxicity poison and employed as a poisoned rodent bait. Adjacent the extremity of the upper front panel 28 which lies at the bottom panel 25, a transverse notch 31 extends for a major portion of the width of the upper front panel 28. The transverse notch 31 is provided in order to permit gravitational feeding of the fluent dry solid 30 from the receptacle formed by the panels of the dispensing feeder 20.

In order to receive and retain dry fluent solids fed through the transverse notch 31 by gravitational flow from the receptacle defined in part by the upper front panel 28, the lower front panel 29 extends substantially perpendicular to the side panels 21, 22 and at an obtuse angle upwardly from the bottom panel 25. The lower front panel 29 is spaced forwardly of the lower extremity of the upper front panel 28 (FIGS. 4 and 5) and forms with the bottom panel 25 and the forwardly extending portions of the side panels 21 and 22 a dispensing tray adapted to receive and retain the fluent dry solid 30.

In order to assure that dispensation of the fluent dry solid material 30 to rodents is facilitated, a particular relationship exists between the front-to-back depth of the top panel 24 and the bottom panel 25. More particularly, the top panel 24 has greater depth than the bottom panel 25, resulting in the upper portion of the upper front panel 28 overlying the lower front panel 29. In order to further facilitate use of the feeder in the dispensing of rodent bait, the upper front panel 28 preferably includes a flap portion 32 which extends upwardly beyond the top panel 24, to provide means for attachment of the feeder 20 to a building structure wall W. The cooperation of the feeder 20 having these particular panel relationships with the wall W and a support surface S of a building structure becomes more apparent with reference to the views of the feeder 20 as so installed (FIGS. 3 and 4). As there shown, the flap portion 32 of the upper front panel 28 is secured to the building wall W by appropriate fasteners such as tacks or nails 34, while the bottom panel 25 is positioned substantially flat on the supporting surface S. Due to the differences in front-to-back depth of the top and bottom panels 24 and 25, the lower front panel 29 is spaced outwardly from the building structure wall W, leaving an unobstructed runway defined between the lower front panel and the building structure wall W for the passage of rodents. The unobstructed passageway has a floor surface which is the same as that presented in adjacent area portions of the supporting surface S. However, due to the retention of quantity of the bait 30 in the dispensing tray formed by the bottom panel 25, side panels 21 and 22 and lower front panel 29, efficient use of the poisoned bait is made possible.

In order to permit avoidance, insofar as possible, of contact by the person installing the feeder 20 in a use location with the poisoned bait 30, the feeder 20 is adapted for use as a shipping package, as well as a dispensing feeder. In particular, the top panel 24 is preferably constructed as a flat lid hingedly connected with the back panel 26, and may be opened upon erection of the feeder 20 to permit the introduction of a quantity of bait 30. The top panel 24 may then be sealed, by appropriate means, to preclude the escape of the fluent dry solid from the receptacle within which the material is received. The gravitational feeding opening defined by the transverse notch 31 in the lower portion of the upper front panel 28 may be closed by an appropriate rupturable sealing means 35 (FIG. 2) such as a paper tape applied to the feeder 20 subsequent to erection from the blank 10 but prior to filling of the receptacle with the bait 30. When so assembled and filled, a quantity of bait will be retained within the receptacle portion of the feeder 20 and will not be exposed for contact with an individual handling the feeder until such time as the rupturable sealing means 35 is broken so as to no longer occlude the transverse notch 31. As is apparent, in the instance that a paper tape is used, the rupturable sealing means 35 may be broken, cut or torn away immediately prior to positioning of the dispenser 20 in a feeding position adjacent the building structure wall W.

In order to further attract rodents to the dispensing feeder 20, at the location of installation, it is comprehended that this invention may include a liquid feeding dispensing means. In particular, a liquid reservoir means 40, such as a small plastic bottle, may be positioned within the receptacle defined by the side panels 21, 22, the top and bottom panels 24, 25, the back panel 26 and the upper front panel 28. A liquid feeding means such as a drip tube 41 may operatively communicate with the reservoir 40 and be positioned for access by rodents moving along the runway, as by extending through the upper front panel 28 to overlie the tray which receives and retains the fluent dry solids dispensed from the feeder 20. The liquid contained within the liquid reservoir means may be water or a water based solution of low toxicity poisons, to further contribute to a lethal effect. The inclusion of a liquid reservoir means and a liquid feeding means communicating therewith is optional, and is not required for usefulness of the dispensing feeder 20.

Having now described the particular manner in which the panels of the dispensing feeder 20 are configured and positioned, so as to define the generally rectangular prismatoid container of this invention, it may now be noted that the blank 10 provides certain auxiliary flaps and panels which do not determine the essential constructional features of the erected feeder 20 but which nevertheless will be defined for the convenience of those who may practice this invention. More particularly, an assembly flap 45 is provided along one side edge of the side panel 22, for securement to the back panel 26 during erection of the flat blank 10 into the three dimensional feeder 20. Pairs of gusset panels 46, 47 and 48, 49 are hingedly interconnected between respective side panels 21 and 22 and the upper front panel 28, in order to accommodate the disposition of the upper front panel 28 at an acuate angle relative to the top panel 24 while permitting the blank 10 to be folded flat while in a partially assembled condition, as is conventional with certain types of field erected cartons. Tuck flaps 50 and 51, adjacent the gusset panels 46–49, are inserted between folded portions of the lower front panel 29, and contribute to stability of the erected feeder 20. Further contributions to the stability of the erected feeder 20 are made by closure flaps 54 and 55 hingedly interconnected with the side panels 21 and 22 and by a locking flap 56 hingedly interconnected with the upper front panel 28. One side edge of the locking flap 56 is configured to cooperate with locking tabs extending from a side edge of the lower front panel 29, to lock the panels of the erected feeder 20 in the erected position. In a similar manner, closure flaps 60 and 61 cooperate with the top panel 24 to assure closure of the upper end of the receptacle defined by the feeder 20 and a closure flap 62 extending from one side edge of the top panel 24 contributes to maintaining the panels of the feeder 20 in the erected position. In the illustration of the blank 10 (FIG. 1), score lines on which panels, flaps, and gussets are foldably connected are indicated by dash-dot lines, while cut lines of separation between adjacent portions of the blank 10 are indicated by unbroken lines.

In the drawings and specification, there has been set forth a preferred embodiment of the invention, and although specific terms are employed, they are used in a generic and descriptive sense only and not for purposes of limitation.

I claim:

1. An arrangement for dispensing and feeding a fluent dry solid such as rodent bait comprising, in combination with a building structure having a vertical wall and a horizontal surface such as a floor, a generally rectangular prismatoid container of sheet material such as paperboard scored and folded into a plurality of interconnected panels and erected to define a pair of parallel spaced apart generally trapezoidal side panels each having front side edge tapering rearwardly and downwardly, a pair of parallel spaced apart rectangular top and bottom panels extending perpendicular to said side panels, a back panel, a feed dispensing upper front panel extending along said tapering side edges perpendicular to said side panels and at an acuate angle downwardly from the forward extremity of said top panel toward convergence with said back panel adjacent said bottom panel, said upper front panel including a transverse opening extending for a major portion of the width thereof adjacent said bottom panel and forming with said back, side, top and bottom panels a receptacle adapted to receive a dry solid and to gravitationally feed the same through said transverse opening, a quantity of fluent dry solid within said receptacle for feeding dispensation therefrom, a feed retaining lower front panel extending perpendicular to said side panels and at an obtuse angle upwardly from said bottom panel, said lower front panel being spaced forwardly of the lower extremity of said upper front panel and rearwardly of the upper extremity of said upper front panel and forming with said bottom panel and said side panels a dispensing tray adapted to receive and retain said dry solid fed through said transverse opening said dispensing tray arrangement constituting a dispensing and feeding means accessible both from a position before said front panels and from positions adjacent said side panels, and means adjacent the coextensive forward side edges of said top panel and said upper front panel for securing said container to said building structure wall with said bottom panel resting on said building structure horizontal surface so that said lower front panel and said building structure wall define therebetween a rodent runway on said building structure horizontal surface free from obstruction and passing adjacent said dispensing tray.

2. An arrangement according to claim 1 wherein said dispensing tray is disposed substantially centrally of the depth of said container.

3. An arrangement according to claim 1 wherein said means for securing said container to said building structure wall comprises an upper portion of said upper front panel which extends upwardly beyond said top panel.

4. An arrangement according to claim 1 and further comprising a liquid reservoir means positioned within said receptacle and a liquid feeding means operatively communicating with said reservoir means and positioned for access by rodents from said runway.

5. An arrangement according to claim 1 wherein said top panel is hingedly connected to said back panel along the coextensive side edges thereof and is movable relative to said upper front and side panels to permit access to said receptacle.

References Cited

UNITED STATES PATENTS

| | | | |
|---|---|---|---|
| 647,800 | 4/1900 | Brown | 119—52 X |
| 1,653,976 | 12/1927 | Anderson | 119—52 |
| 2,157,953 | 5/1939 | DeLong | 43—131 |
| 2,532,681 | 12/1950 | Stover | 43—131 |
| 2,568,168 | 9/1951 | Query | 43—131 |
| 2,763,093 | 9/1956 | Scott et al. | 43—131 |
| 2,912,788 | 11/1959 | Hargrove | 43—131 |
| 3,298,128 | 1/1968 | Dill et al. | 43—131 |

ALDRICH F. MEDBERY, Primary Examiner

U.S. Cl. X.R.

119—52, 51.5